US011859659B2

United States Patent
Pye et al.

(10) Patent No.: US 11,859,659 B2
(45) Date of Patent: Jan. 2, 2024

(54) COMPLIANT FOIL THRUST BEARING

(71) Applicant: Bladon Jets Holdings Limited, Castletown (IM)

(72) Inventors: Stephen Pye, Warwick (GB); Vasudeva Nimma, Warwick (GB); Phillip Heward, Warwick (GB)

(73) Assignee: Bladon Jets Holdings Limited, Castletown (IM)

( * ) Notice: Subject to any disclaimer, the term of this patent is extended or adjusted under 35 U.S.C. 154(b) by 82 days.

(21) Appl. No.: 17/624,573

(22) PCT Filed: Jul. 1, 2019

(86) PCT No.: PCT/EP2019/067622
§ 371 (c)(1),
(2) Date: Jan. 4, 2022

(87) PCT Pub. No.: WO2021/001016
PCT Pub. Date: Jan. 7, 2021

(65) Prior Publication Data
US 2022/0275827 A1   Sep. 1, 2022

(51) Int. Cl.
*F16C 17/04* (2006.01)

(52) U.S. Cl.
CPC ........ *F16C 17/042* (2013.01); *F16C 2360/23* (2013.01)

(58) Field of Classification Search
CPC .................................................... F16C 17/042
See application file for complete search history.

(56) References Cited

U.S. PATENT DOCUMENTS 6,752,533 B2 * 6/2004 Saville ................. F16C 17/042
                                                          384/106
9,695,868 B2 * 7/2017 Metz ..................... F16C 17/042

FOREIGN PATENT DOCUMENTS

| JP | S60172721 A | 9/1985 |
| KR | 20010063914 A | 7/2001 |
| WO | 2015028051 A1 | 3/2015 |
| WO | 2015157052 A1 | 10/2015 |

OTHER PUBLICATIONS

Pye, S., et al., 202217002891, Intellectual Property India Patent Office Action, dated Mar. 31, 2022, 7 pages.
Pye, S., et al., PCT/EP2019/067622, International Search Report, dated Mar. 18, 2020, 4 pages.
Pye, S., et al., PCT/EP2019/067622, Written Opinion, dated Mar. 18, 2020, 8 pages.

* cited by examiner

*Primary Examiner* — James Pilkington
(74) *Attorney, Agent, or Firm* — Rahman LLC

(57) ABSTRACT

A compliant foil thrust bearing subassembly comprising: a fluid plate comprising an annular mating ring and a plurality of fluid foil elements disposed radially inwardly from the fluid plate mating ring; a force transfer plate comprising an annular mating ring and a plurality of force transfer elements disposed radially inwardly from the force transfer plate mating ring; and a spring plate comprising an annular mating ring and a plurality of deflection elements disposed radially inwardly from the spring plate mating ring, wherein: the fluid plate, the force transfer plate and the spring plate are stackable such that each fluid foil element is axially supported by a corresponding pair of overlapping force transfer elements and deflection elements.

13 Claims, 7 Drawing Sheets

COMPLIANT FOIL THRUST BEARING

TECHNICAL FIELD

The subject matter disclosed herein relates generally to compliant foil thrust bearings.

BACKGROUND

Micro turbines may be utilized in distributed energy resources and may employ a compressor, combustor, turbine and electric generator thereby to convert fuel into a local source of electric power. Whereas their high operating temperatures render traditional bearings, such as oil-based hydrostatic bearings, impractical, their high rotational speeds affords the opportunity to use air bearings. Elimination of an oil system simplifies design and reduces maintenance requirements.

Whereas radial bearings support radial loads, thrust bearings support axial loads. Compliant fluid foil thrust bearings generally utilize: a thrust plate; compliant spring foil members axially supported by the thrust plate; and a fluid plate comprising fluid foil elements axially supported by the spring foil members, the fluid plate for axially supporting a rotating thrust disk through the remaining plates.

Following spin-up, the rotating thrust disk is axially supported by a thin layer of fluid that is created between the non-rotating fluid plate and the rotating thrust disk, giving rise to a low friction hydrodynamic air bearing, and, additionally, the transfer of fluid facilitates heat transfer.

Whereas the thrust disk is typically flat, the fluid foil elements are typically ramped and stepped in a circumferential direction, this surface inclination in a circumferential direction giving rise to the generation of the fluid film and an axial lifting effect imparted to the thrust disk. Thus axial load imparted by the rotating thrust disk may be transmitted through the fluid film, through the fluid plate, through the compliant spring foil members and to the thrust plate, which provides an equal and opposite reactive axial force to match the axial load imparted on the bearing. The presence of the fluid film in this force transmission chain affords the possibility to significantly reduce the frictional losses that might otherwise occur owing to relative rotation between surfaces.

Compliant fluid foil thrust bearings may thus be employed in micro turbines to combat the impracticalities associated with other traditional forms of bearing given the high rotational speeds and operating temperatures.

Existing fluid foil thrust bearing designs generally employ a series of separate plates sometimes employing non-planar features to provide a resilient spring effect. Such existing designs not only result in excessive manufacturing complexity but also suffer from poor performance such as via the generation of excessive frictional forces, particularly at low revolutions per minute.

It is therefore desirable to provide a fluid foil thrust bearing resolving one or more of the above-described deficiencies in existing designs.

BRIEF DESCRIPTION OF THE DRAWINGS

Disclosed arrangements are further described hereinafter by way of example and with reference to the accompanying drawings, in which.

DETAILED DESCRIPTION

Figure 1:
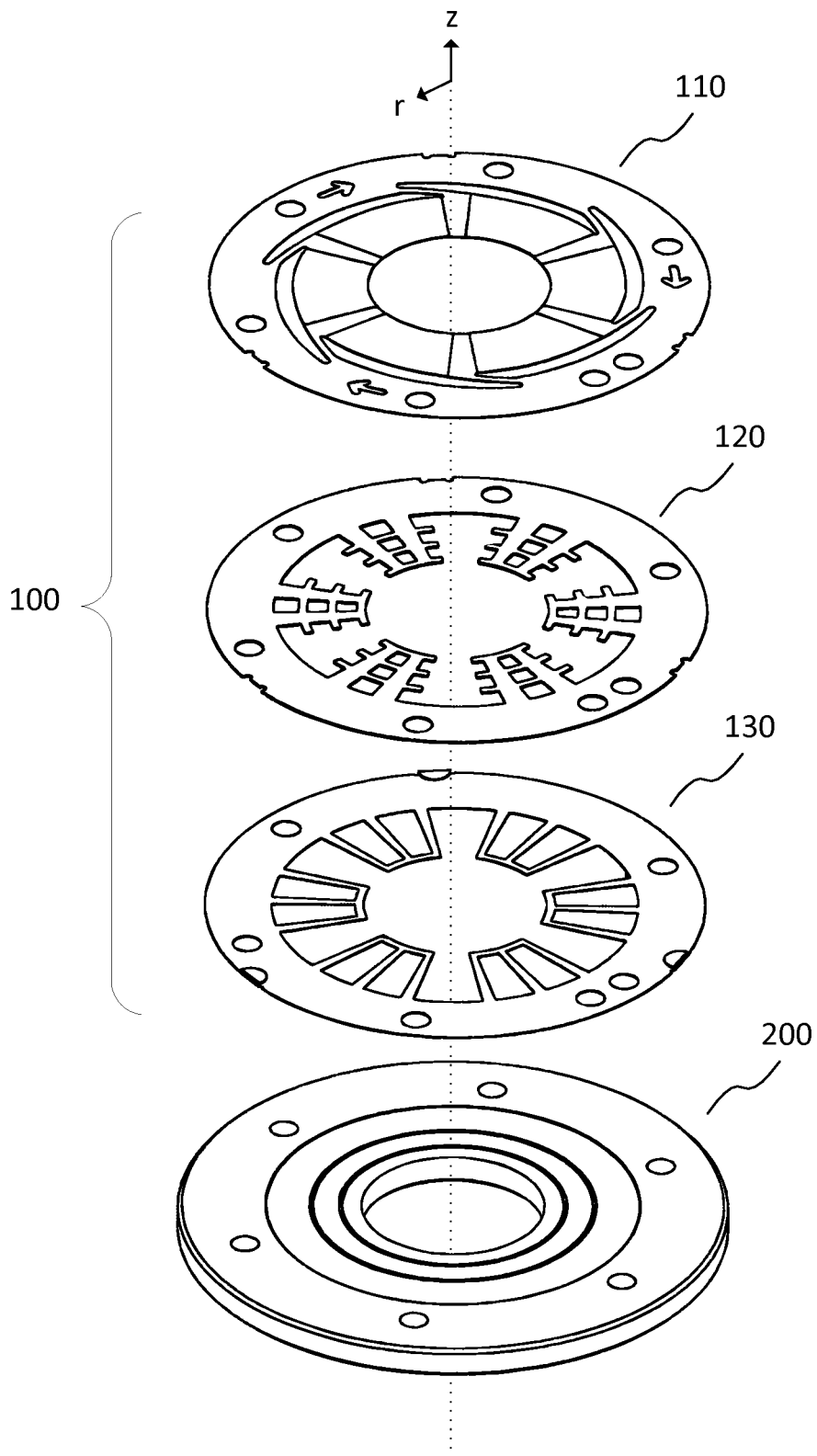
FIG. 1 depicts an exploded perspective view of an example of a compliant thrust bearing comprising a compliant thrust bearing subassembly and a thrust plate.

FIG. 1 depicts an example of a compliant foil thrust bearing comprising a compliant foil thrust bearing subassembly 100 and a thrust plate 200.

The compliant foil thrust bearing subassembly 100 comprises a fluid plate 110, a force transfer plate 120 and a spring plate 130.

As shown in FIG. 1, the force transfer plate 120 and the spring plate 130 are at least substantially planar. Whereas the fluid foil plate 110 may comprise out-of-plane features, the force transfer plate 120 and spring plate 130 may be planar. In the example shown, the force transfer plate 120 and spring plate 130 are formed with a fixed cross-sectional profile. The provision of planar and axially uniform plates of a compliant foil thrust bearing offers significantly simplified manufacturing. In particular, the plates may be formed as cut-outs from sheet metal.

In the example shown, the plates of the compliant foil thrust bearing subassembly 100 are arranged to share a common axis running through their centers. In the example of FIG. 1, this common axis extends vertically through the plate centres. The thrust plate 200 is arranged to share the common axis.

Figure 2:
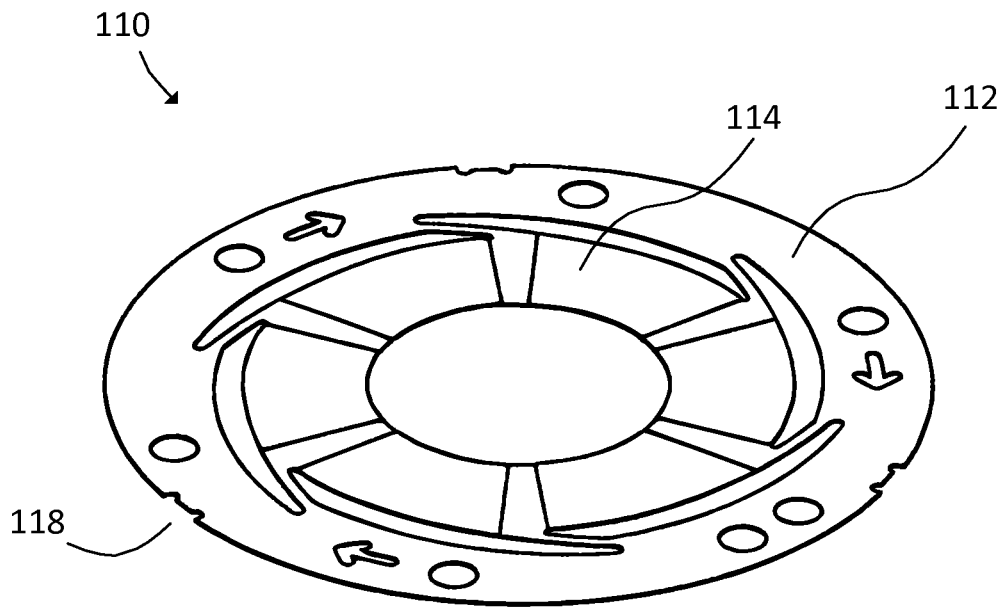
FIG. 2 depicts an example of a fluid plate comprising fluid foil elements.

The fluid foil elements 114 may be evenly distributed around the circumference of the annular mating ring 112. The fluid foil elements 114 may be formed in radially opposing pairs, as shown in FIG. 2. Such a symmetrical distribution, especially in combination with the same in respect of correspondingly distributed force transfer elements 124 and deflection elements 134, facilitates uniform circumferential load distribution, helping safeguard against any localized stress concentrations, which would otherwise increase losses and wear.

FIG. 2 depicts a fluid plate 110 suitable for receiving a rotating thrust disk. The fluid plate 110 comprises an annular mating ring 112 and fluid foil elements 114 disposed radially inwardly from the fluid plate mating ring 112. The fluid foil elements 114 are arranged to provide axial undulation in a circumferential direction. This circumferential undulation is responsible for generating a fluid film upon rotation of an adjacent thrust disk, this fluid film for axially supporting the rotating thrust disk.

Axial force imparted by the rotating thrust disk onto the top side of the fluid plate is non-constant during both startup and normal operation. Such load variation is accommodated in thrust bearings by the provision of compliance, i.e. resilience in the form of an underlying spring mechanism coupled to the fluid plate underside.

The fluid plate 110 may comprise notches 118 provided on the radially outer edge thereof for receiving a tab. Alternatively, the fluid plate 110 may comprise tabs, not shown, to be received by corresponding notches provided on the radially outer edges of one or more underlying plates. This notch and tab arrangement facilitates retention between one or more plates of the thrust bearing subassembly 100.

Figure 3:
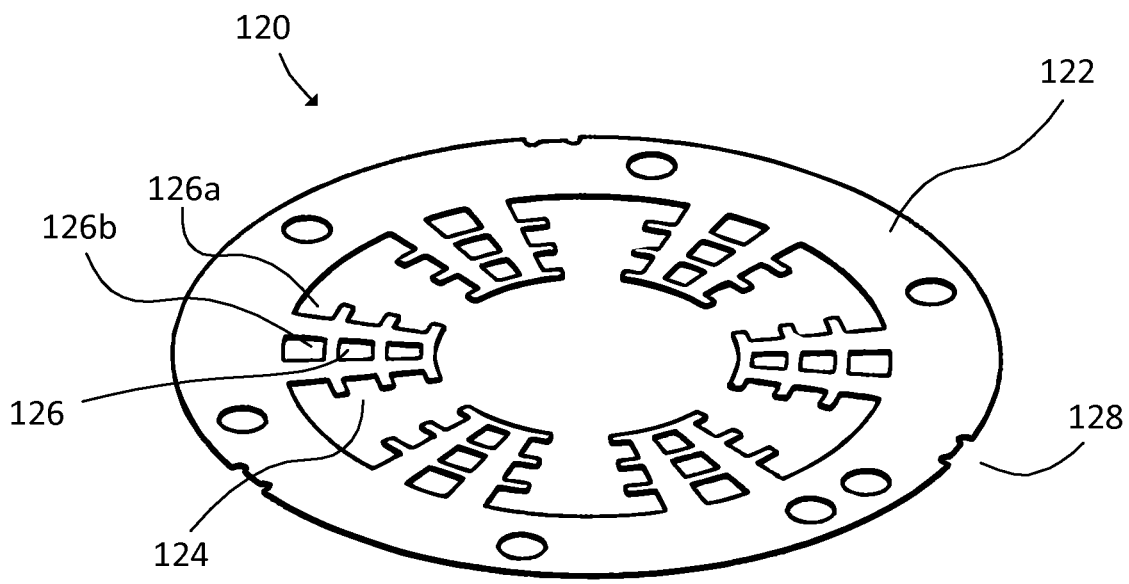
FIG. 3 depicts an example of a force transfer plate comprising radially inwardly extending force transfer elements.

FIG. 3 depicts a force transfer plate 120 comprising an annular mating ring 122 and force transfer elements 124 disposed radially inwardly from the annular mating ring 122. The force transfer elements 124 may extend radially inwards from the annular mating ring 122.

As shall be described in greater detail below, each force transfer element 124 may comprise through-holes 126. As shown in this example, each force transfer element 124 may comprise a grid forming open 126a and/or closed 126b through-holes.

As shown, the force transfer plate 120 may comprise notches 128 provided on the radially outer edge thereof for receiving a tab.

Figure 4:
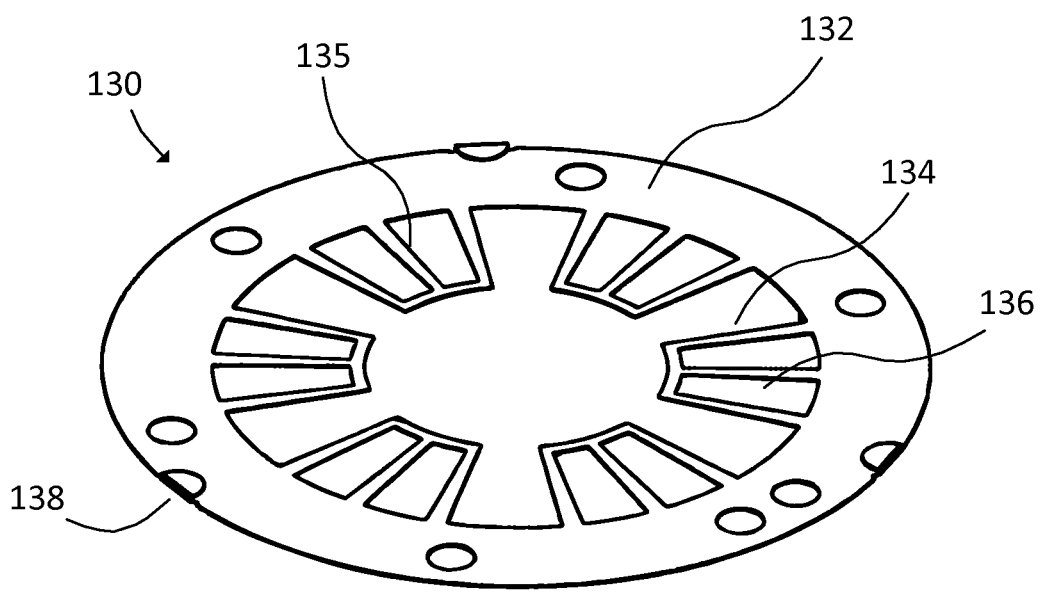
FIG. 4 depicts an example of a spring plate comprising radially inwardly extending deflection elements.

FIG. 4 depicts a spring plate 130 comprising an annular mating ring 132 and deflection elements 134 disposed radially inwardly from the annular mating ring 132. The deflection elements 134 may extend radially inwards from the annular mating ring 132.

Figure 7A:
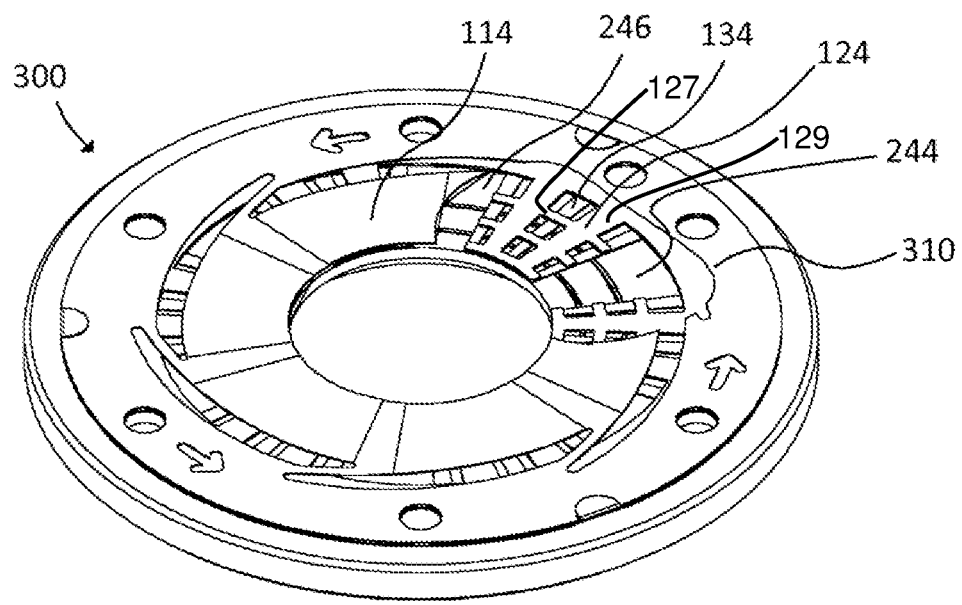
FIGS. 7a and 7b depict different views of a compliant thrust bearing showing a cutout region in the fluid foil plate to expose the underlying plates.

Force transfer plate 120 and spring plate 130 of thrust bearing subassembly 100 together facilitate the axial transmission of axial load generated by the fluid foil elements 114 of fluid plate 110. In particular, each of the circumferentially-spaced fluid foil elements 114 may be supported by a corresponding pair of axially overlapping force transfer elements 124 and deflection elements 134. As shown in FIG. 7a, the overlapping pairs of force transfer elements and deflection elements may comprise offset circumferential and/or radial portions, i.e. the offset circumferential and/or radial portions of the force transfer elements are offset, or non-overlapping, from those of the deflection elements.

In the specific example of FIG. 7a, the force transfer elements 124 comprise interconnected circumferential and radial portions, and the corresponding deflection elements 134 comprise interconnected radial portions. The radial portions of the force transfer elements 124 are circumferentially offset with respect to the radial portions of the deflection elements 134, and circumferential portions of the force transfer elements 124 are arranged to contact the radial portions of the deflection elements 134. This overlapping contact facilitates transmission of axial force through the force transfer and spring plates 120 and 130 of subassembly 100 at circumferentially spaced regions thereby to support the axial load imparted by the circumferentially spaced fluid foil elements 114 of fluid plate 110. It will be recognized that other forms of overlapping contact between the force transfer elements 124 and deflection elements 134 are possible.

The force transfer elements 124 and deflection elements 134 may be circumferentially separate, thereby facilitating the provision of circumferentially spaced axial support channels within the thrust bearing upon stacking.

As shall be described in greater detail below, each deflection element 134 may comprise radially extending portions 135. These radially-extending portions may be arranged to overlap with axial through-holes 126 provided in the force transfer elements 124, which axial through-holes 126 may be arranged to overlie the radially extending portions 135. This facilitates resilient deflection of the deflection elements.

Each deflection element 134 and/or each force transfer element 124 may comprise a grid forming open and/or closed through-holes 126, 136. In the example shown, only closed through-holes are present in the deflection elements 124, though it will be recognized that further open through-holes could be provided, as shown in respect of the force transfer elements 124 of the force transfer plate 120.

The spring plate 130 may comprise notches 138 providing on the radially outer edge thereof for receiving a tab from an overlying or underlying plate.

In the example shown, the spring plate 130 comprises tabs 138. The tabs 138 are arranged to wrap into the notches of the overlying force transfer plate 120 and fluid plate 110, securely retaining the plates of the thrust bearing subassembly 100 together.

Alternatively the fluid plate 110 could comprise tabs arranged to wrap into notches of the force transfer plate and the spring plate.

Figure 5:
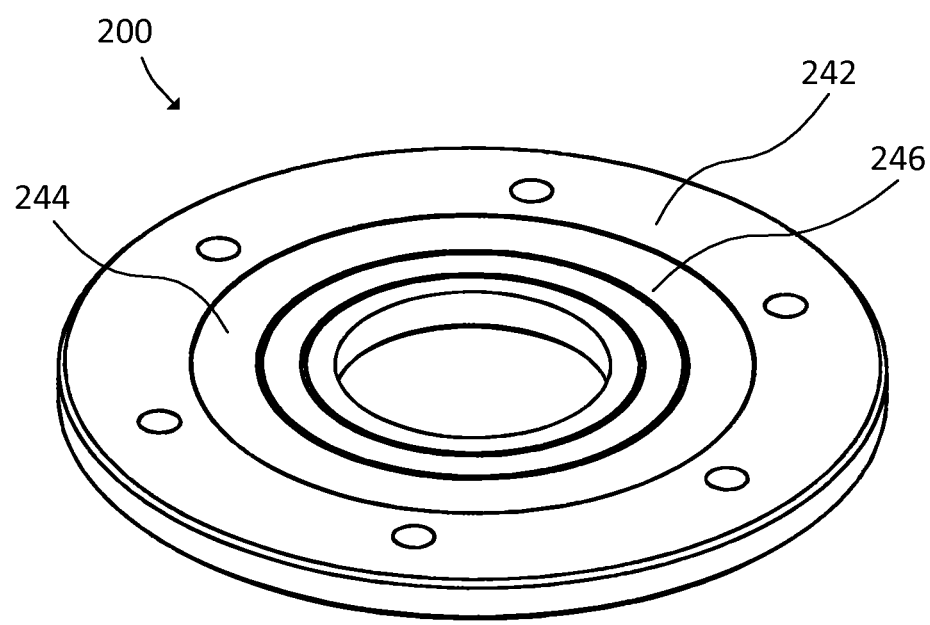
FIG. 5 depicts an example of a thrust plate comprising an axially recessed surface.

FIG. 5 depicts a thrust plate 200 comprising an annular mating surface 242 and a recessed surface 244 disposed radially inwardly from the annular mating surface 242. The recessed surface 244 is axially recessed from the annular mating surface 242. In the example shown, the annular mating surface 242 extends axially beyond the recessed surface 244. Thus the thickness of the thrust plate 140 is radially non-uniform, with the thickness in the radially outer portion comprising the annular mating surface 242 greater than that of the radially inner portion comprising the recessed surface 244.

This contrasts with prior art arrangements in which a substantially flat thrust plate 140 is provided.

The provision of the axially recessed surface 244 presents the opportunity for overlying deflection elements 134 to extend towards the thrust plate 140 and axially beyond the annular mating surface 242.

The facilitation of such axial deflection of the deflection elements 134 affords the provision of compliance by the spring plate. In this way the deflection elements 134 might be considered to act as radially inwardly extending cantilevers.

Each fluid foil element 114 may be axially supported by underlying pairs of overlapping force transfer elements 124 and deflection elements 134. Thus load imparted via the fluid film from a rotating thrust disk, not shown, may be transmitted via the fluid foil element 114, through a corresponding force transfer element 124 and to a corresponding deflection element 134, which may be caused to resiliently deflect in an axial direction towards the thrust plate 140 and into the recessed space formed by virtue of the recess provided in the thrust plate.

In the example shown, the thrust plate 140 comprises supports 246 disposed radially inwardly from the annular mating surface 242. The supports may be provided with the same height as that of the annular mating surface, i.e. the supports may terminate at an axial position that lies substantially within a plane defined by the annular mating surface 242.

The supports 246 may comprise a convex surface for contacting the overlying deflection elements 134. The provision of such a convex surface facilitates bending of the deflection elements 134 around one or both sides of each support.

The depth of the recess 244 and/or supports 246 serve to limit deflection of the deflection elements 134 in the axial direction. In this case the deflection elements 134 are arranged to deflect on one or both sides of each support 246. For example, in the case a support 246 is provided that is radially outside a radially inner end of a deflection element 134, the deflection element may bend on both radially outer and inner sides of the support 246, whereas in the case a support 246 is disposed substantially at the radially inner end of the a deflection element 134, the deflection element 134 may bend on the radially outer side of the support 246. The axially recessed surface 244 may serve to limit deflection of the deflection elements 134 by way of contact therebetween following sufficient deflection of the deflection elements 134.

In the example shown, the supports 246 are annular and co-centric. However, the supports 246 may take other forms. For example, the supports 246 may extend in an annular direction underneath each deflection element 134, optionally with annular discontinuities existing between the supports. Or the supports 246 take the form of other shapes such as rods. The provision of annular supports simplifies manufacturing.

There may be provided a support 246 arranged to underlie each deflection element 124.

The one or more supports 246 may be arranged such that they are disposed radially outside of the radially inner edge of each deflection element 134. The one or more supports 246 may be disposed radially inwardly of the mating surface 132 of the spring plate 130 and radially outwardly of the radially inner edge of the spring plate 130.

As shown in FIG. 7a, the force transfer elements 124 may comprise interconnected circumferential and radial portions. Corresponding and underlying deflection elements 134 may comprise radial portions arranged to extend in between radial portions of the force transfer elements 124. Circumferential portions of the force transfer elements 124 may be arranged to contact radial portions of the deflection elements 134. Supports 246 may comprise circumferential portions arranged to extend between circumferential portions of the force transfer elements 124 and contact radial portions of the deflection elements 134. In this way force transmission is provided through overlapping and circumferential/radial contacts.

Downward axial load on the force transfer elements 124 may be transmitted to the deflection elements 134 via circumferential portions of the force transfer elements 124, which contact with radial portions of deflection elements 134, which in turn contact with circumferential portions of supports 134, and are arranged to axially deflect into the axially recessed region 244 of thrust plate 200.

Figure 9A:
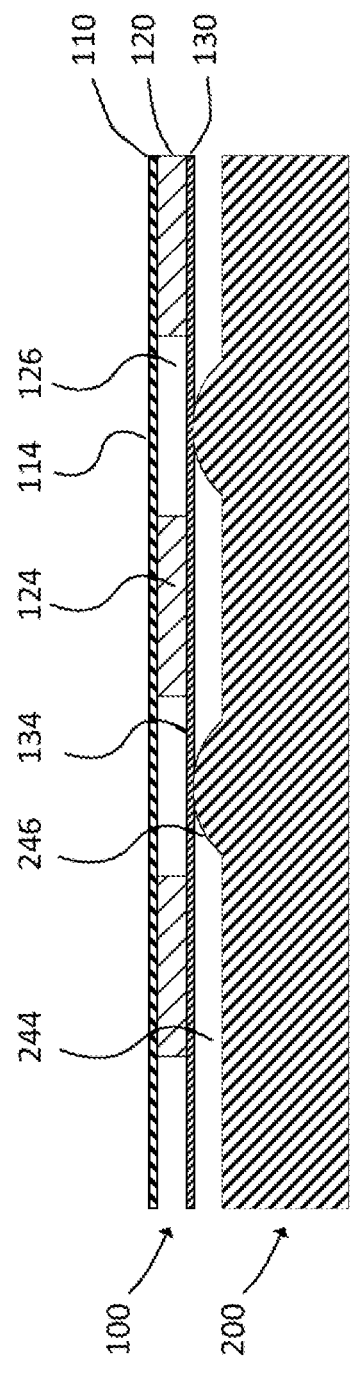
FIGS. 9a and 9b depict an exaggerated view showing an example of interaction between supports of the thrust plate and deflection elements of the spring plate.
Figure 9B:
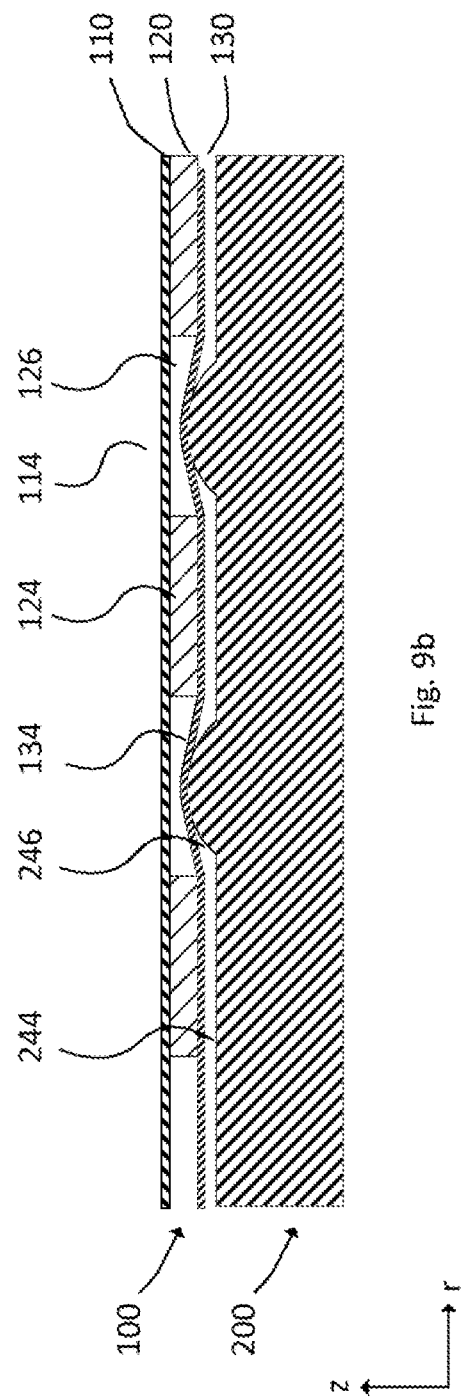

Attention is directed to FIGS. 9a and 9b, which show an exaggerated radial cross-section showing the layered structure of a compliant foil thrust bearing comprising the compliant foil thrust bearing subassembly 100 and thrust plate 200.

In the direction of increasing elevation, in the Z-direction shown in FIGS. 9a and 9b, there is shown the recessed surface 244, supports 246, deflection element 134, force transfer element 124 and fluid foil element 114.

In this example, load imparted via the fluid film formed above the fluid foil element 114 by a rotating thrust disk is transferred from the fluid foil element 114, through the corresponding force transfer element 124 and to the corresponding deflection element 134, one or more portions of which is caused to deflect over the supports 246 and into an axial through-hole 126, such deflection in the axial direction shown in the transition from FIG. 9a to FIG. 9b.

Figure 6A:
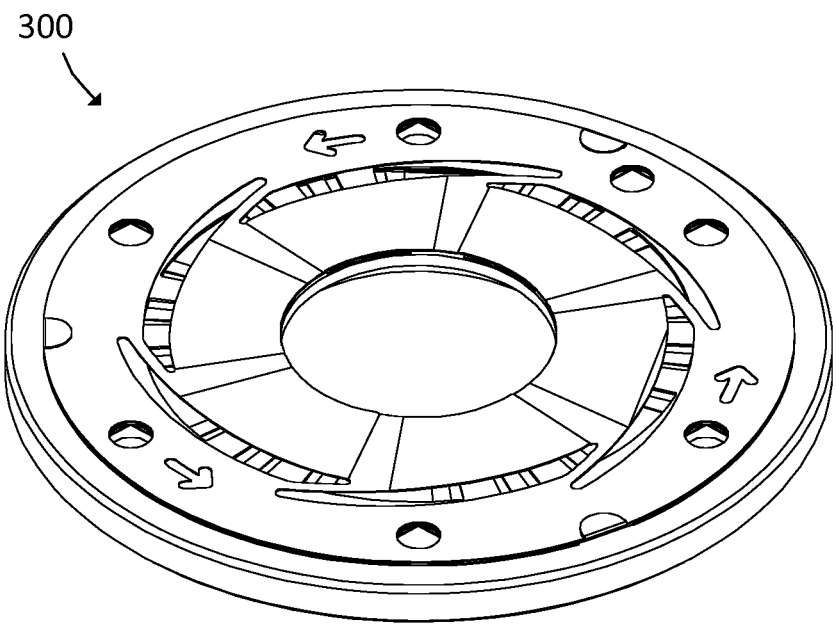
FIG. 6a depicts an example of a compliant thrust bearing and FIG. 6b depicts the same but offering a view through the plates.
Figure 6B:
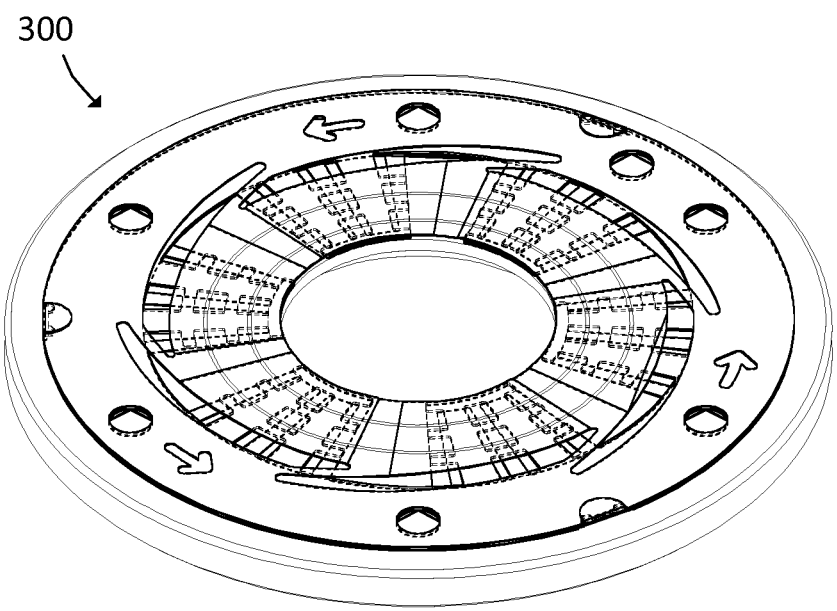

FIGS. 6a and 6b show respectively a compliant foil thrust bearing 300 and the same providing a view through the plates thereof.

Figure 7B:
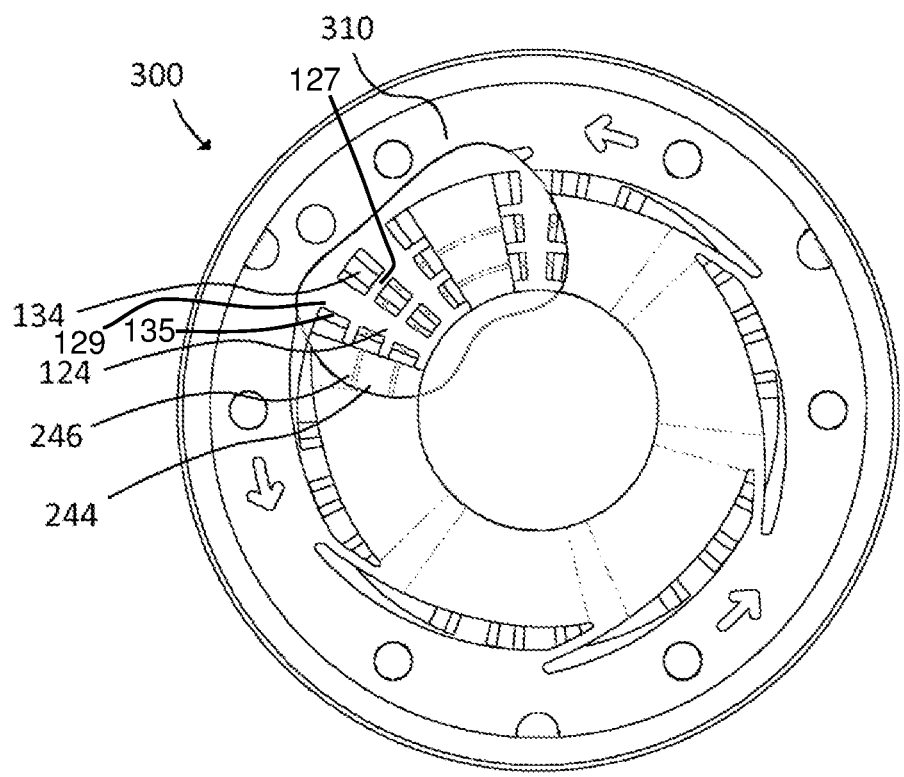

Likewise, FIGS. 7a and 7b show a compliant foil thrust bearing 300 but this time with a cutout portion 310 revealing recessed surface 244, supports 246, deflection elements 134, force transfer elements 124 and fluid foil elements 114.

The cutout portions 310 demonstrate in this example of a compliant foil thrust bearing 300 the relative interaction between plates of the compliant foil thrust bearing subassembly 100 and thrust plate 200.

As is apparent from consideration of FIGS. 6a, 6b, 7a and 7b, the fluid plate 110, the force transfer plate 120 and the spring plate 130 may be vertically stacked such that the fluid foil elements 114, the force transfer elements 124, and the deflection elements 134 are circumferentially aligned with each other in an axially overlapping relationship.

Thus the plates of the subassembly 100 may be stacked such that each fluid foil element 114 is axially supported by a pair of corresponding and axially overlapping force transfer elements 124 and deflection elements 134.

In the example shown in FIG. 1, the fluid plate 110 overlies the force transfer plate 120 and the force transfer plate 120 overlies the spring plate 130. In the event that the subassembly 100 and thrust plate 200 are combined, the spring plate overlies the thrust plate 200.

The order of stacking anticipated in the example of FIG. 1 is that the spring plate 130 is positioned onto the thrust plate 200, the force transfer plate 120 is positioned onto the spring plate 130 and finally the fluid plate 110 is positioned onto the force transfer plate 120. During or following stacking, the plates can be oriented such that the fluid foil elements 114 are axially supported by corresponding pairs of overlapping force transfer elements 124 and deflection elements 134.

The plates are orientable such that each fluid foil element 114 overlies a corresponding force transfer element 124, which force transfer element 124 overlies a corresponding deflection element 134. In this way force transmitted from each fluid foil element 114 may be transmitted through the corresponding force transfer element 124 to the corresponding deflection element 134. The force imparted to the deflection element 134 may cause the deflection element 134 to axially displace relative to the spring plate mating ring 132. The direction of displacement is axially away from the fluid plate 110.

Whereas in some prior art implementations corrugated foil is provided to facilitate compliance having a tendency to give rise to plastic deformation in use, according to the examples described herein there is facilitated the possibility to safeguard against such plastic deformation owing to the force transfer mechanism disclosed herein.

In the examples disclosed herein, there is provided a compliant foil thrust bearing subassembly 100 for positioning directly onto a thrust plate 200 offering a minimal number of plates and thus reduced manufacturing complexity and performance variation as compared to the case when a higher number of plates are employed.

Particular attention is directed to the interaction between a force transfer element 124 and a corresponding deflection element 134.

In particular, as shown in these figures, the force transfer elements 124 and/or the deflection elements 134 may comprise axial through-holes 126, 136. These axial through-holes may be open and/or closed axial through-holes. The force transfer elements 124 and/or the deflection elements 134 may comprise grids comprising axial through-holes. For example, each force transfer element 124 may comprise a grid defining axial through-holes 126.

The deflection elements 134, or at least portions thereof, may be arranged to be extendable within the axial through-holes 126 of the force transfer elements 124.

With reference to FIGS. 9a and 9b, axial through-holes 126 provided in the force transfer elements 124 facilitate axial displacement of the deflection elements 134 into the through-holes 126 formed in the force transfer elements 124.

Each force transfer element 124 may comprise a force transfer element grid and each corresponding deflection element 134 may comprise an overlapping and offset deflection element grid. By overlapping and offsetting the force transfer element and deflection element grids in this way, there is facilitated relative displacement therebetween in an axial direction for the purpose of resiliently transferring load and providing compliance in the compliant foil thrust bearing.

It will be recognized that whilst the examples provided herein show specific transfer element 124 and deflection element 134 geometries, the overall principle is applicable to a wide variation in terms of geometries.

Supports 246 of the thrust plate 200 may be arranged so as to axially overlap with axial through-holes 126 of the force transfer plate 120 and/or axial through-holes 136 of the spring plate 130, as is particularly visible in FIGS. 7a and 7b.

Radial portions of the deflection elements 134 may be arranged so as to axially overlap with axial through-holes 125 of the force transfer plate 120, as shown in FIGS. 7a and 7b.

Thus supports 246 of the thrust plate 200 and/or portions of deflection elements 134 and portions of force transfer elements 124 may be axially intermeshed so as to present gaps into which portions of the deflection elements 134 can extend. Such extension facilitates relative movement between the plates, conferring resilience.

In the example shown in FIGS. 7a and 7b, the force transfer elements 124 comprise radially extending portions 127 interconnected by circumferentially extending portions 129. The force transfer elements 124 overlap with underlying deflection elements 134. The deflection elements 134 comprise radially extending portions arranged to extend between the overlying radially extending portions 127 of the corresponding force transfer elements 124. The circumferentially extending portions 129 of the force transfer elements 124 contact with the underlying radially extending portions 135 of the corresponding deflection elements 134. The annular supports 246 of the underlying thrust plate 200 extend between the circumferential portions 129 of the force transfer elements 124. This form of interconnection facilitates excellent resilience characteristics that are highly configurable to individual applications.

Figure 8A:
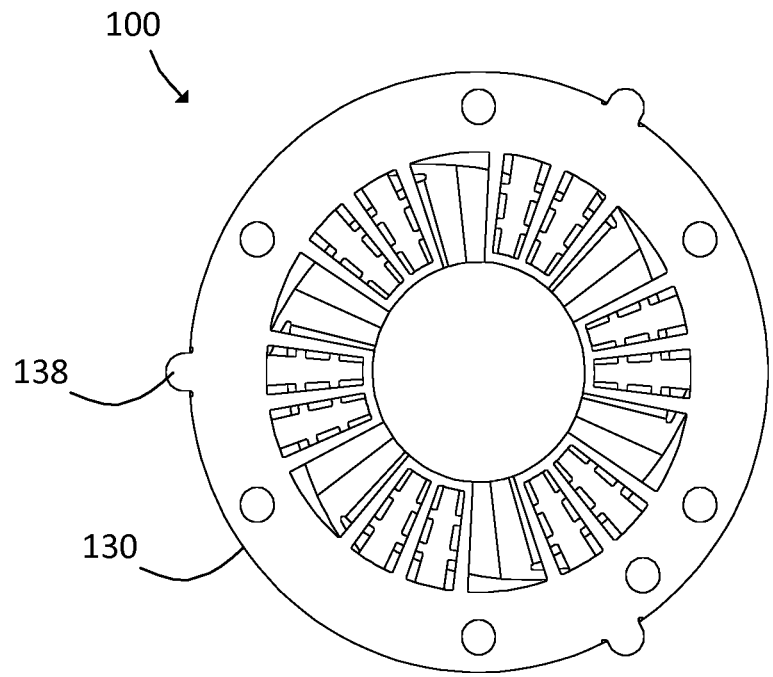
FIGS. 8a and 8b depict an example of the underside of a compliant foil thrust bearing subassembly with retaining tabs in the extended and folded positions respectively.
Figure 8B:
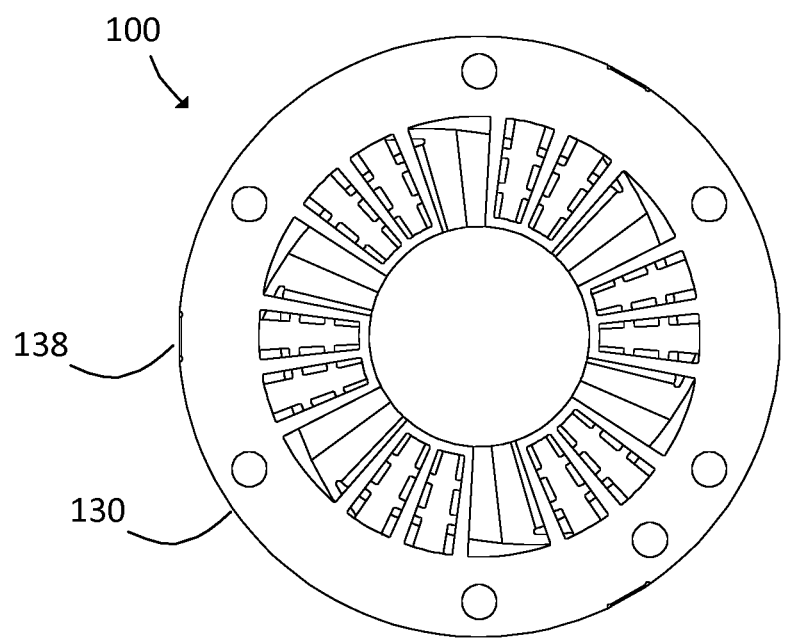

FIGS. 8a and 8b show tabs 138 of the spring plate 130 in extended and folded orientations. Thus the plates can be stacked together, with the tabs 138 then folded over the remaining plates to retain them in position.

The force transfer plate 120 may be provided with a thickness that is greater than that of the spring plate 130, and optionally also greater than that of the fluid plate 110, as shown in FIGS. 9a and 9b. It has been identified that the provision of a force transfer plate with a greater thickness than that of the spring plate safeguards against performance deterioration associated with distortion of the force transfer plate. The increased thickness force transfer plate helps in evenly spreading the forces to be transmitted over a greater working area of the fluid plate.

The fluid plate may comprise a thickness between 0.076 and 0.127 mm. The force transfer plate 120 may comprise a thickness between 0.1 and 0.25 mm, or between 0.127 and 0.25 mm. The spring plate 130 may comprise a thickness between 0.076 and 0.127 mm.

Each of the examples disclosed herein, including the claimed examples, may be provided in a gas turbine system, e.g. a micro turbine system, comprising the compliant foil thrust bearing according to any one example. Employing such a compliant foil thrust bearing in a gas turbine system provides a gas turbine system offering improved performance characteristics owing to improved management of frictional losses and heat, and simplified manufacturing.

It will be recognized that the examples disclosed herein are not limiting and are capable of numerous modifications and substitutions.

What is claimed is:

1. A compliant foil thrust bearing subassembly comprising:
   a fluid plate comprising an annular mating ring and a plurality of fluid foil elements disposed radially inwardly from the fluid plate mating ring;
   a force transfer plate comprising an annular mating ring and a plurality of force transfer elements disposed radially inwardly from the force transfer plate mating ring, wherein the plurality of force transfer elements comprises axial through-holes; and
   a spring plate comprising an annular mating ring and a plurality of deflection elements disposed radially inwardly from the spring plate mating ring, wherein:
   the fluid plate, the force transfer plate and the spring plate are stackable such that each fluid foil element is axially supported by a corresponding pair of overlapping force transfer elements and deflection elements.

2. The complaint foil thrust bearing subassembly according to claim 1, wherein:
   the deflection elements comprise portions arranged to overlap with the axial through-holes of corresponding force transfer elements.

3. The complaint foil thrust bearing subassembly according to claim 2, wherein:
   the deflection elements comprise radially extending portions; and
   the force transfer elements comprise radially extending portions arranged to extend between radially extending portions of corresponding deflection elements.

4. The complaint foil thrust bearing subassembly according to claim 3, wherein:
   the force transfer elements comprise circumferentially extending portions arranged to contact the radially extending portions of the deflection elements.

5. The compliant foil thrust bearing subassembly according to claim 4, wherein:
   the force transfer plate is substantially planar; and/or
   the spring plate is substantially planar.

6. A compliant foil thrust bearing comprising:
   a compliant foil thrust bearing subassembly comprising:
      a fluid plate comprising an annular mating ring and a plurality of fluid foil elements disposed radially inwardly from the fluid plate mating ring;
      a force transfer plate comprising an annular mating ring and a plurality of force transfer elements disposed radially inwardly from the force transfer plate mating ring, wherein the plurality of force transfer elements comprises axial through-holes; and a spring plate comprising an annular mating ring and a plurality of deflection elements disposed radially inwardly from the spring plate mating ring, wherein:
the fluid plate, the force transfer plate and the spring plate are stackable such that each fluid foil element is axially supported by a corresponding pair of overlapping force transfer elements and deflection elements; and
a thrust plate coupled to the compliant foil thrust bearing, wherein the thrust plate comprises:
an annular mating surface; and
a recessed surface disposed radially inwardly from the annular mating surface.

7. The thrust plate according to claim 6, comprising:
one or more supports axially extending from the recessed surface.

8. The thrust plate according to claim 7, wherein:
each support extends in an annular direction.

9. The thrust plate according to claim 8, wherein:
each support comprises a convex surface.

10. The thrust plate according to claim 9, wherein: each support axially extends from the recessed surface to a position substantially lying within a plane defined by the annular mating surface.

11. A method of rotatably supporting a thrust disk on a thrust plate comprising:

providing a thrust plate comprising an axially recessed surface;
stacking on the thrust plate a spring plate comprising an annular mating ring and a plurality of deflection elements disposed radially inwardly from the spring plate mating ring;
stacking on the spring plate a force transfer plate comprising an annular mating ring and a plurality of force transfer elements disposed radially inwardly from the force transfer plate mating ring, wherein the plurality of force transfer elements comprises axial through-holes;
stacking on the force transfer plate a fluid plate comprising fluid foil elements arranged to overlap with the force transfer elements, wherein:
axial force transmitted from the thrust disk is transferred through each fluid foil element, through a corresponding underlying force transfer element and to a corresponding underlying deflection element, which deflection element deflects axially towards the recessed surface of the thrust plate.

12. The method according to claim 11, wherein:
the thrust plate comprises one or more supports axially extending from the axially recessed surface and arranged to contact the deflection elements.

13. The method according to claim 12, wherein:
the one or more supports extend in an annular direction.

* * * * *